(12) United States Patent
Church, IV et al.

(10) Patent No.: US 11,357,020 B2
(45) Date of Patent: Jun. 7, 2022

(54) CONNECTING COMPUTER PROCESSING SYSTEMS AND TRANSMITTING DATA

(71) Applicant: INTERNATIONAL BUSINESS MACHINES CORPORATION, Armonk, NY (US)

(72) Inventors: Walter Church, IV, Binghamton, NY (US); Jason J. Herne, Vestal, NY (US); John Michael Hollenbeck, Owego, NY (US); Kevin Meeks, Binghamton, NY (US); Kenneth Galbraith, Binghamton, NY (US); Scott Mason, Endicott, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 16/783,499

(22) Filed: Feb. 6, 2020

(65) Prior Publication Data

US 2021/0250962 A1    Aug. 12, 2021

(51) Int. Cl.
| | |
|---|---|
| *H04W 76/10* | (2018.01) |
| *H04W 72/12* | (2009.01) |
| *H04W 76/14* | (2018.01) |
| *H04W 4/80* | (2018.01) |
| *H04W 84/18* | (2009.01) |

(52) U.S. Cl.
CPC ........... *H04W 72/121* (2013.01); *H04W 4/80* (2018.02); *H04W 76/14* (2018.02); *H04W 84/18* (2013.01)

(58) Field of Classification Search
CPC combination set(s) only.
See application file for complete search history.

(56) References Cited

U.S. PATENT DOCUMENTS

| | | |
|---|---|---|
| 7,016,417 B1 | 3/2006 | Roman et al. |
| 7,558,953 B2 | 7/2009 | Osthoff et al. |
| 10,405,256 B2 | 9/2019 | Van et al. |

(Continued)

FOREIGN PATENT DOCUMENTS

| | | |
|---|---|---|
| CN | 208424610 U | 1/2019 |
| CN | 111656796 A | 9/2020 |

(Continued)

OTHER PUBLICATIONS

List of IBM Patents or Patent Applications Treated as Related; Date Filed: Feb. 6, 2020, p. 1-2.

(Continued)

*Primary Examiner* — Cindy Trandai
(74) *Attorney, Agent, or Firm* — Cantor Colburn LLP; Edward Wixted

(57) ABSTRACT

Examples described herein provide a computer-implemented method that includes assigning each of a plurality of processing systems to one of a plurality of groups. Each group of the plurality of groups cycles, based on an offset time period, between an advertiser state, a listener state, and a sleep state. The method further includes connecting a first processing system of a first group of the plurality of groups to a second processing system of a second group of the plurality of groups when the first group is in one of the listener state or the advertiser state and the second group is in the other of the listener state or the advertiser state.

19 Claims, 16 Drawing Sheets

(56) References Cited

U.S. PATENT DOCUMENTS

| | | |
|---|---|---|
| 2003/0035140 A1 | 2/2003 | Tomita et al. |
| 2003/0093308 A1 | 5/2003 | Kiefer |
| 2003/0208386 A1 | 11/2003 | Brondrup |
| 2004/0193998 A1 | 9/2004 | Blackburn et al. |
| 2005/0251820 A1 | 11/2005 | Stefanik et al. |
| 2007/0061018 A1 | 3/2007 | Callaghan et al. |
| 2008/0103896 A1 | 5/2008 | Flake et al. |
| 2008/0280618 A1 | 11/2008 | Gaast et al. |
| 2009/0265187 A1 | 10/2009 | Boone et al. |
| 2013/0007226 A1 | 1/2013 | White et al. |
| 2013/0019042 A1 | 1/2013 | Ertugay et al. |
| 2013/0155898 A1 | 6/2013 | Yin et al. |
| 2013/0166960 A1* | 6/2013 | Das .................. H04L 43/0847 714/47.1 |
| 2014/0169599 A1* | 6/2014 | Solum ................ H04R 25/554 381/315 |
| 2014/0355582 A1* | 12/2014 | Kamath ............... H05K 999/99 370/338 |
| 2015/0172906 A1* | 6/2015 | Terazaki ........... H04W 52/0216 455/434 |
| 2016/0098309 A1 | 4/2016 | Kim |
| 2016/0142906 A1 | 5/2016 | Park et al. |
| 2016/0196576 A1 | 7/2016 | Cannon et al. |
| 2016/0241389 A1 | 8/2016 | Le Saint et al. |
| 2017/0026905 A1 | 1/2017 | Denboer et al. |
| 2017/0034647 A1* | 2/2017 | Takeuchi .............. H04W 8/005 |
| 2017/0086098 A1* | 3/2017 | Kwon .................... H04L 47/27 |
| 2017/0161786 A1* | 6/2017 | Terazaki ........... G06Q 30/0269 |
| 2017/0223128 A1 | 8/2017 | Shuvaev et al. |
| 2017/0251347 A1 | 8/2017 | Mehta et al. |
| 2017/0325161 A1 | 11/2017 | Kwon et al. |
| 2018/0007523 A1 | 1/2018 | Knaappila |
| 2018/0098338 A1* | 4/2018 | Choi ...................... H04L 29/08 |
| 2019/0020909 A1 | 1/2019 | Petajan et al. |
| 2019/0089958 A1 | 3/2019 | Nishi et al. |
| 2019/0132392 A1 | 5/2019 | Liu et al. |
| 2019/0132934 A1 | 5/2019 | Leinen et al. |
| 2019/0150062 A1 | 5/2019 | Bradley et al. |
| 2019/0246353 A1* | 8/2019 | Jensen .................. G06F 9/4893 |
| 2020/0021397 A1 | 1/2020 | Fruehling et al. |
| 2020/0137542 A1* | 4/2020 | Jung ...................... H04W 4/80 |
| 2020/0177348 A1* | 6/2020 | Agarwal ............... H04L 1/1854 |
| 2020/0196323 A1* | 6/2020 | Church .................. H04W 4/80 |
| 2020/0314904 A1 | 10/2020 | Fodor et al. |
| 2021/0044680 A1* | 2/2021 | Kang ..................... H04W 4/80 |
| 2021/0105346 A1 | 4/2021 | Pandey |
| 2021/0112250 A1 | 4/2021 | Taubman |
| 2021/0250425 A1* | 8/2021 | Herne, IV ............... H04L 67/42 |
| 2021/0250743 A1 | 8/2021 | Church, IV et al. |

FOREIGN PATENT DOCUMENTS

| | | |
|---|---|---|
| CN | 112468251 A | 3/2021 |
| EP | 0122027 B1 | 8/1987 |
| KR | 102234100 B1 | 3/2021 |
| WO | 2018187212 A1 | 10/2018 |

OTHER PUBLICATIONS

Walter Church IV, et al.,"Connecting Computer Processing Systems and Transmitting Data," U.S. Appl. No. 16/783,501, filed Feb. 6, 2020.

Jason J. Herne, et al.,"Connecting Computer Processing Systems and Transmitting Data," U.S. Appl. No. 16/783,498, filed Feb. 6, 2020.

"Base64"; Wikipedia; 2021; 1 Page.

Cui et al.; "A Survey on Application of Machine Learning for Internet of Things"; International Journal of Machine Learning and Cybermetics; 2018; pp. 1399-1417.

Josefsson; "The Base16, Base32, and Base64 Data Encodings"; RFC4648; Network Working Group; Oct. 2006; 18 Pages.

Wang et al.; "Implementing Mobile Ad Hoc Networking (Manet) Over Legacy Tactical Radio Links"; IEEE; 2007; 7 Pages.

* cited by examiner

CONNECTING COMPUTER PROCESSING SYSTEMS AND TRANSMITTING DATA

BACKGROUND

The present invention generally relates to computer processing systems, and more specifically, to connecting computer processing systems and transmitting data.

Computer processing systems (or simply "processing systems") come in many forms, such as laptops, desktops, smartphones, tablet computers, wearable computing devices, smart displays, and the like. These processing systems can include, for example, sensors, displays, memories, processors, data storage devices, and communication interfaces. The communication interfaces enable two or more processing systems to communicate with one another by transmitting and receiving data between/among them. For example, two processing systems can form a direct wired and/or wireless communicative link and can transmit data from one processing system to the other processing system. As another example, two or more processing systems can form a network that facilitates transmitting and receiving data between or among the two or more processing systems.

SUMMARY

Embodiments of the present invention are directed to connecting computer processing systems and transmitting data.

A non-limiting example computer-implemented method for establishing data connections between a plurality of processing systems includes assigning each of the plurality of processing systems to one of a plurality of groups. Each group of the plurality of groups cycles, based on an offset time period, between an advertiser state, a listener state, and a sleep state. The method further includes connecting a first processing system of a first group of the plurality of groups to a second processing system of a second group of the plurality of groups when the first group is in one of the listener state or the advertiser state and the second group is in the other of the listener state or the advertiser state.

A non-limiting example computer-implemented method for exchanging data between a plurality of processing systems includes converting, by a first processing system, a binary data stream into a string using encoding. The method further includes advertising, by the first processing system, standard characteristics to a second processing system. The method further includes receiving, by the first processing system, a request from the second processing system for a payload size and payload characteristics for the data to be transmitted from the first processing system to the second processing system. The method further includes transmitting, by the first processing system, the payload size and the payload characteristics to the second processing system.

A non-limiting example computer-implemented method includes establishing, by a second processing system, a first connection with a first processing system. The method further includes receiving, by the second processing system, a first postcard from the first processing system via the first connection, the first postcard comprising information associated with the first processing system. The method further includes establishing, by the second processing system, a second connection with a third processing system. The method further includes transmitting, by the second processing system, a second postcard to the third processing system via the second connection, the second postcard comprising information associated with the second processing system. The method further includes transmitting, by the second processing system, the first postcard to the third processing system via the second connection.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
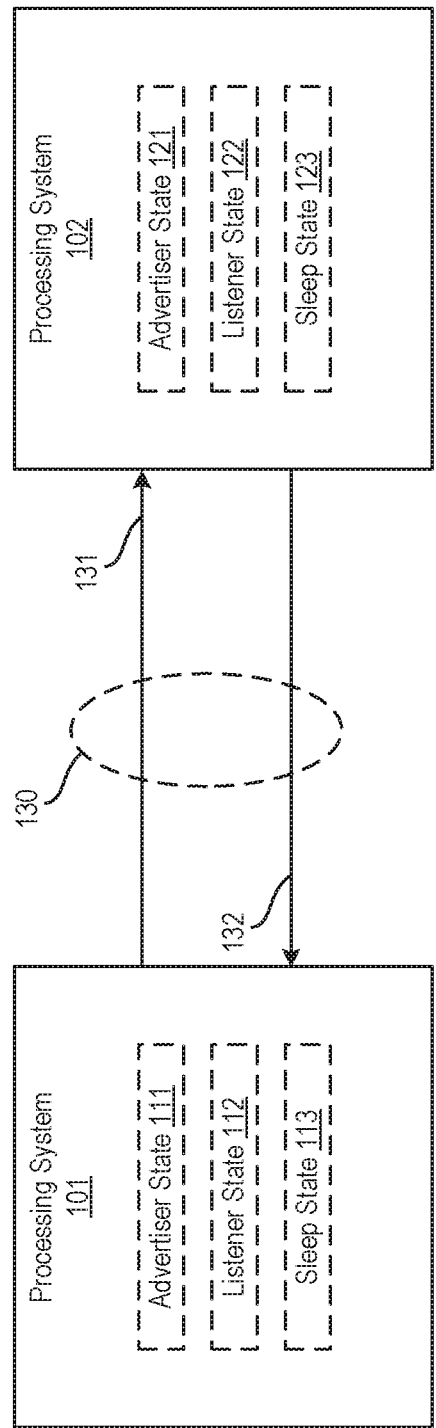
FIG. 1 depicts a block diagram of processing systems according to one or more embodiments described herein.

The diagrams depicted herein are illustrative. There can be many variations to the diagrams or the operations described therein without departing from the scope of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide techniques for connecting computer processing systems and transmitting data. As one example, the techniques described herein facilitate connecting two processing systems with limited or no user interaction, transmitting a general purpose data stream (referred to herein as a "postcard") over the connection between the two processing systems, and then sharing the postcard with other processing systems and/or a cloud computing environment.

One example implementation of the present techniques can be useful in the event of an emergency or natural disaster type situation. For example, in many emergency or natural disaster situations, people need the ability to communicate, such as to let others know their location and whether they are safe. Conventional solutions to this problem rely on fixed communications infrastructure (i.e., cellular network, Internet, etc.) and a manual action taken by the user (e.g., sending a message, making a phone call, etc.). This infrastructure can fail or destabilize due to loss of power, physical damage to equipment, towers, or cabling and the like. If a typical communications network is unavailable or a person is unable or chooses not to take action to communicate, others may not be able to determine the whereabouts of the person and/or his or her condition.

In such emergency or natural disaster type situations, the present techniques enable two processing systems to connect and exchange information without user action. The information can be relayed to other processing systems and/or to a cloud computing environment.

With so many interconnected processing systems, from smartphones to Internet of Things (IoT) devices, it may be desirable for them to connect to one another easily and efficiently. It may also be desirable to reduce user interaction that is needed for establishing such processing systems so that the connection can occur without user interaction. Conventional processing systems tend to use a random scheme of listening and advertising to attempt to connect to one another. When two processing systems are in alternating states, one in a "listener state" and the other in an "advertiser state," the two processing systems can detect each other and can attempt to create a connection. However, if the devices are operating in the same state at the same time, they are unable to connect. For example, if two processing systems are both operating in "listener states," then the processing systems are unable to connect.

Traditionally, it can be very difficult for processing systems to connect without any user interaction. For example, processing systems that are changing states too quickly may not have enough time to create a connection. Autonomous roaming mobile processing systems may be attempting to create connections with other such processing systems but are not in alternating signals long enough because they switch too soon due to randomization. Processing systems also need to conserve power so that they do not die and need to be recharged. The power consumption used during the advertising and listening states can be significant if used continuously without a break. Conventionally, a sleep state can be used to reduce power consumption. However, this approach can be problematic because one processing system may be in the sleep state (not in either of the advertiser or listener states) while another processing system is attempting to connect by operating in one of the advertiser or listener states. This can prevent processing systems from connecting.

To address these issues of conventional approaches for connecting processing systems, a technique for connecting processing systems without user interaction using offset time period groupings is described herein. In particular, the techniques described herein create groups that cycle between the listener state and the advertiser state at different offset time periods. These offset time periods are assigned to groups. Processing systems are randomly assigned to a group so that they are able to connect to the processing systems in the other group(s). After listening or broadcasting/advertising for a connection time, the processing systems go into a sleep state to conserve energy. The processing systems can be reassigned to other groups, such as after a predetermined amount of time, number of cycles, number of successful connections, randomly, etc. This enables these processing systems that were in the same group to potentially connect. In some examples, processing systems can be assigned a random seed. Processing systems with the same random seed maintain the same group assignments, thereby preventing processing systems with the same random seeds from connecting to one another.

The above-described aspects address at least some of the shortcomings of the prior art by providing a greater ability for processing systems to connect to one another without needing any user input/interaction after an initial timing is set for the offset time period. Further, the techniques described herein conserve energy for the processing systems by selectively using sleep states, such as after every listener/advertiser state cycle. With each of the processing systems on the same schedule, they do not waste energy advertising or listening unnecessarily (i.e., at times where other processing systems are not also listening or advertising).

FIG. 1 depicts a block diagram of processing systems 101, 102 according to one or more embodiments described herein. The processing systems 101, 102 can be any suitable type of computing processing system, such as the processing system 1200 of FIG. 12, and can have one or more of the components described regarding the processing system 1200, such as a processing device, a memory, and the like.

It may be desirable to establish a connection 130 between the processing systems 101, 102 to enable data to be transmitted from the processing system 101 to the processing system 102 (shown by the arrow 131) and to enable data to be transmitted from the processing system 102 to the processing system 101 (shown by the arrow 132). Establishing such a connection traditionally requires user interaction (i.e., interaction by a user or users of the processing systems 101 and/or 102). However, some communications protocols do not require such user interaction, such as Bluetooth Low Energy (BTLE).

The processing systems 101, 102 can be in different operating states (i.e., modes), including an advertiser state, a listener state, and a sleep state. For example, the processing system 101 can be in one of an advertiser state 111, a listener state 112, or a sleep state 113. Similarly, the processing system 102 can be in one of an advertiser state 121, a listener state 122, or a sleep state 123.

In order to establish the connection 130 between the processing systems 101, 102, one of the processing systems 101, 102 advertises (i.e., broadcasts) information about itself while in the advertiser state for other processing systems that are in a listener state to detect. For example, if the processing system 101 is in the advertiser state 111 and the processing system 102 is in the listener state 122, the processing system 101 can advertise/broadcast information that is detected and received by the processing system 102 to enable the connection 130 to be established. In the context of BTLE, the information that is advertised/broadcast can be in the form of a packet having a preamble, an access address, a data unit having a header and payload, and a cyclic redundancy check value.

Figure 2A:
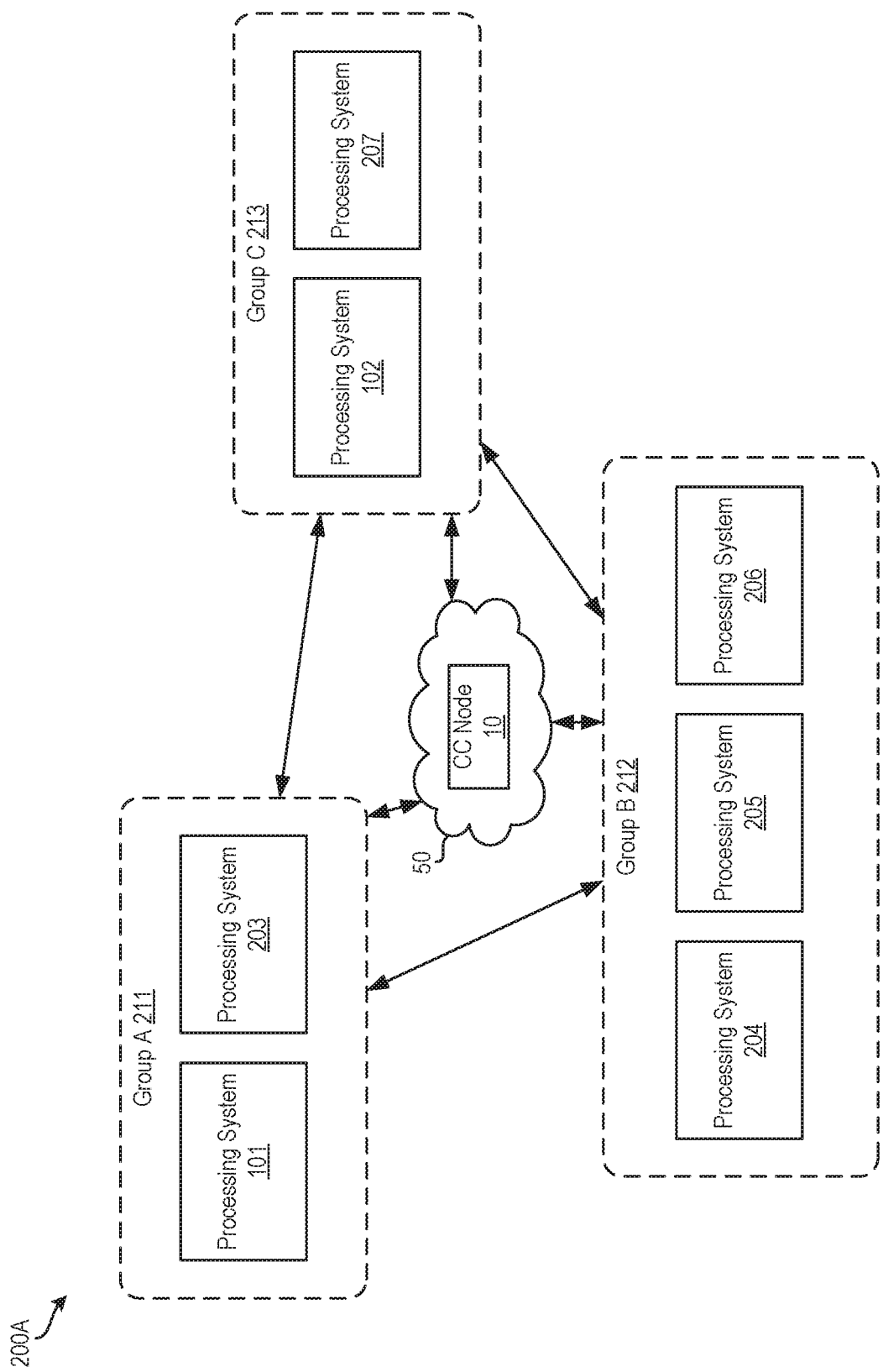
FIG. 2A depicts a block diagram of an environment of groups of processing systems that can establish connections according to one or more embodiments described herein.
Figure 2B:
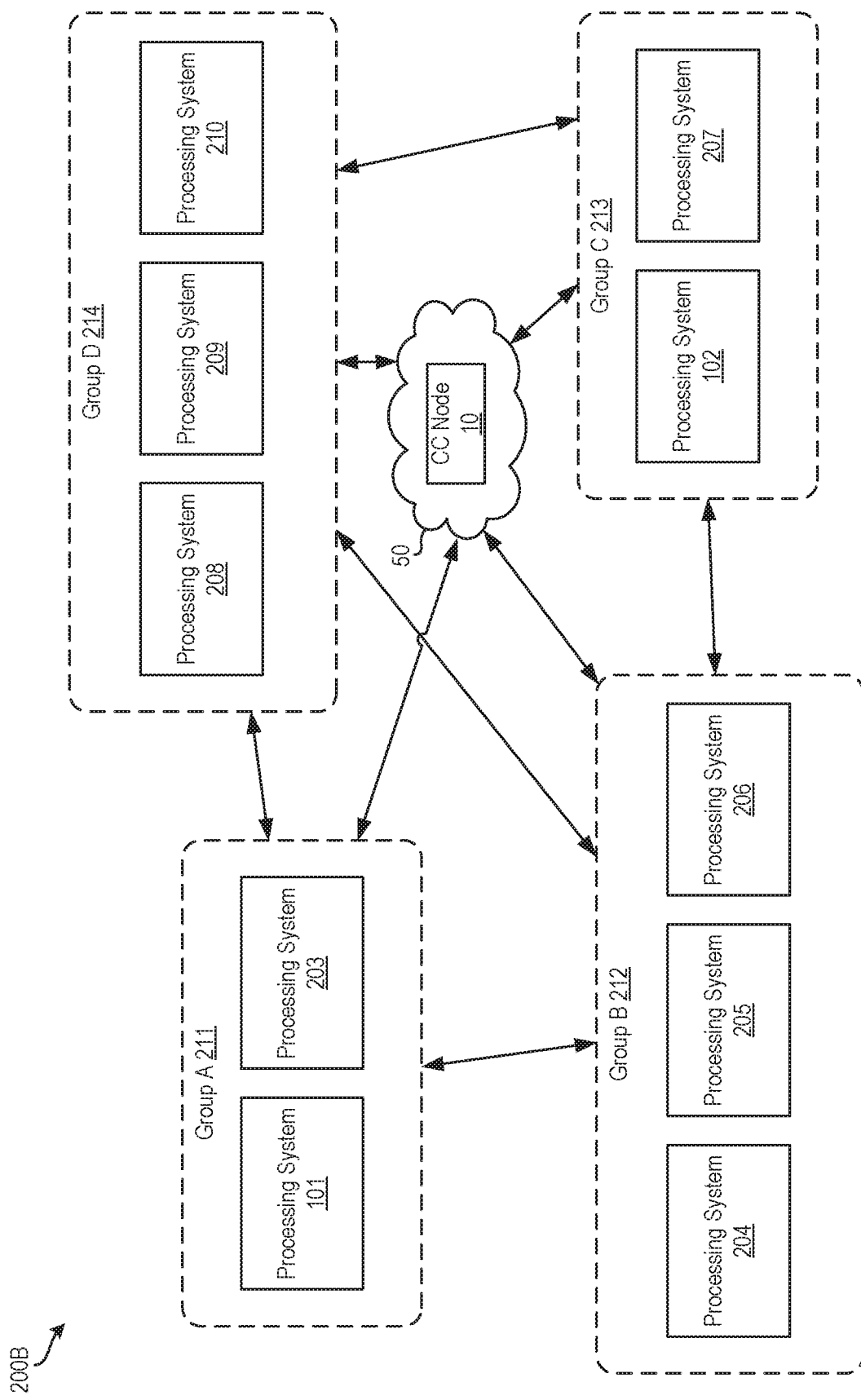
FIG. 2B depicts a block diagram of an environment of groups of processing systems that can establish connections according to one or more embodiments described herein.

In some examples, processing systems are assigned to groups that cycle between the listener state and the advertiser state at different offset time periods. FIGS. 2A and 2B depict examples of such groups. Particularly, FIG. 2A depicts a block diagram of an environment 200A of groups of processing systems that can establish connections according to one or more embodiments described herein. In this example, three groups are implemented: group A 211, group B 212, and group C 213.

Each of the groups A 211, B 212, C 213 have processing systems assigned thereto. As depicted in FIG. 2A, the group A 211 has the processing system 101 of FIG. 1 as well as processing system 203 assigned thereto. Similarly, the group B 212 has processing systems 204, 205, 206 assigned thereto. The group C 213 has the processing system 102 of FIG. 1 and processing system 207 assigned thereto.

FIG. 2B depicts a block diagram of an environment 200B of groups of processing systems that can establish connections according to one or more embodiments described herein. In this example, three groups are implemented: group A 211, group B 212, group C 213, and group D 214.

Each of the groups A 211, B 212, C 213, D 214 have processing systems assigned thereto. The groups A 211, B 212, C 213 have the processing systems assigned as depicted in FIG. 2A, while the group D 214 has processing systems 208, 209, 210 assigned thereto.

It should also be appreciated that the processing systems 101, 102, 203-210 depicted in FIGS. 2A and 2B can also establish a connection with a cloud computing node 10 in a cloud computing environment 50, which are further described herein.

In the example of FIG. 2A, each of the groups A 211, B 212, C 213 are in the range of each other and thus their respective processing systems can connect to one another. However, in another example, as shown in FIG. 2B, the processing systems 101, 203 of the group A 211 are not in range of the processing systems 102, 207 of the group C 213. In such cases, mesh networking techniques can be used to send information, such as a postcard, between the processing systems of groups A 211, C 213 via the processing systems of the groups B 212, D 214 and/or via the cloud computing environment 50.

Figure 3:
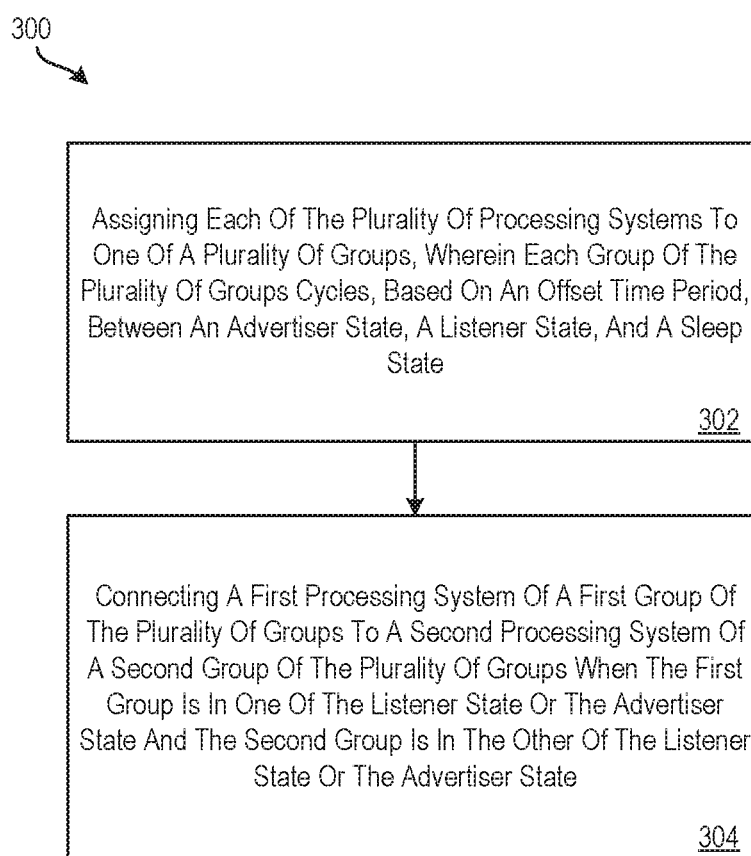
FIG. 3 depicts a flow diagram of a method for establishing data connections between a plurality of processing systems according to one or more embodiments described herein.
Figure 4A:
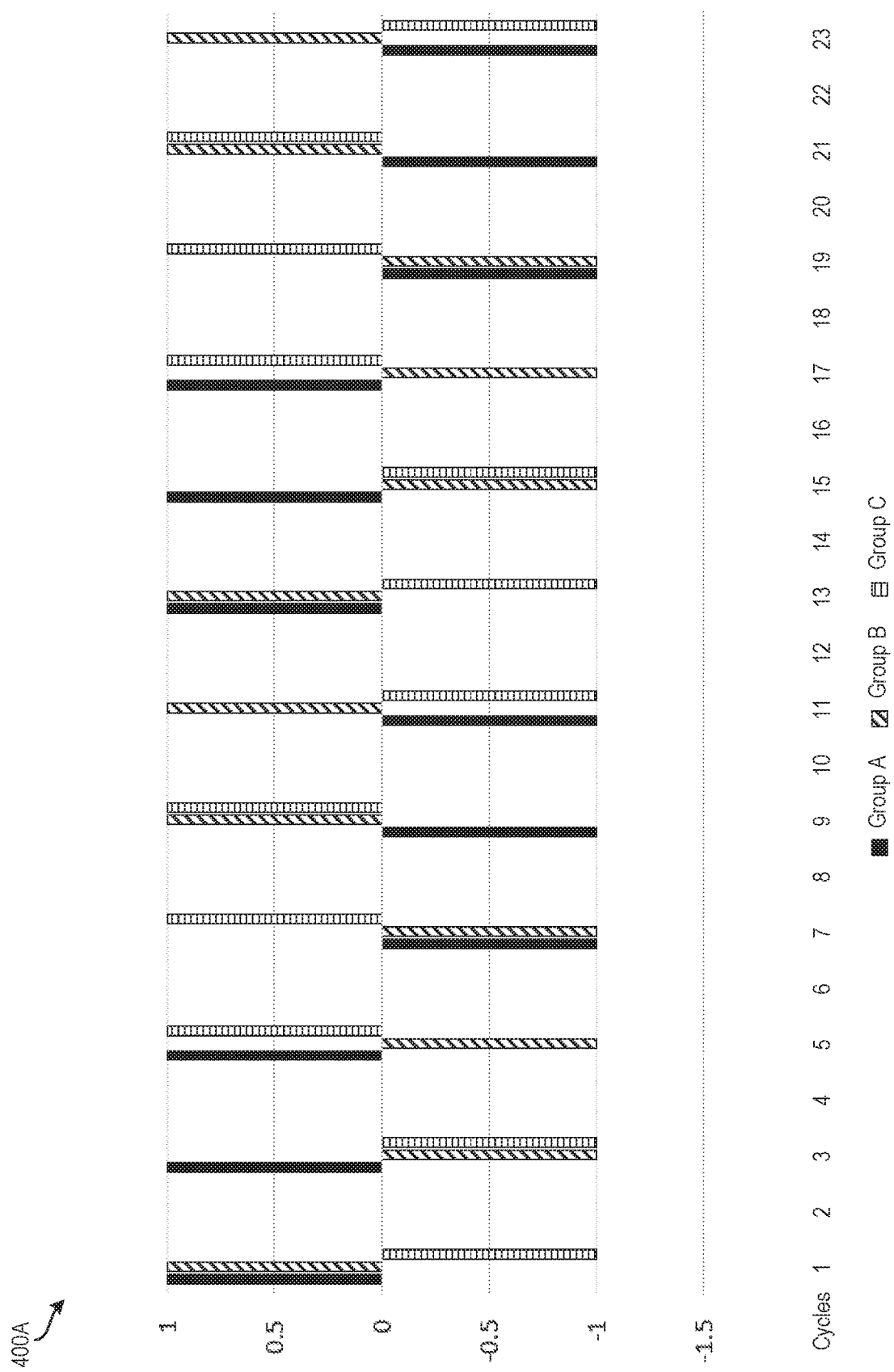
FIG. 4A depicts a timing diagram according to one or more embodiments described herein.
Figure 4B:
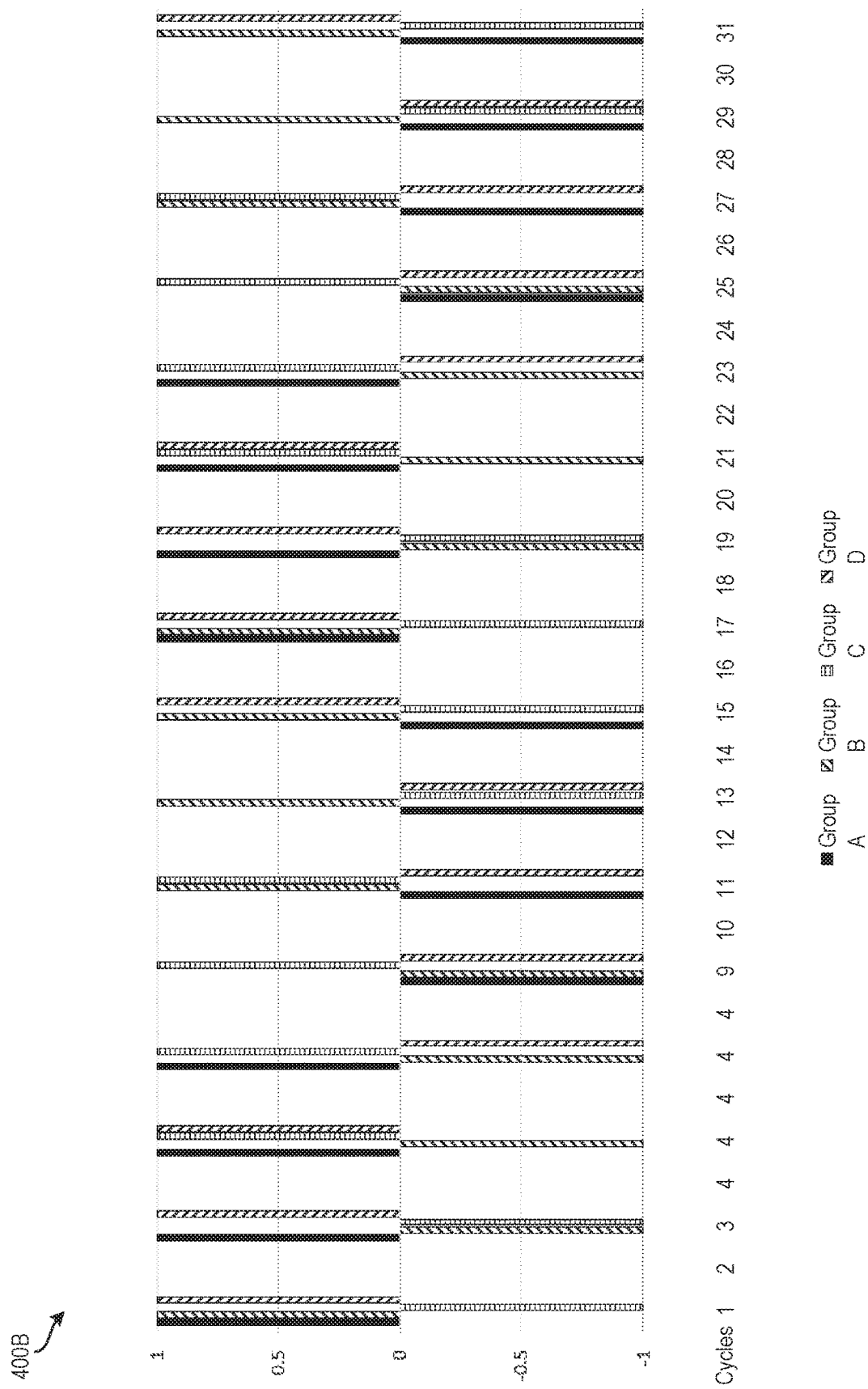
FIG. 4B depicts a timing diagram according to one or more embodiments described herein.

The groups A 211, B 212, C 213, D 214 and their respective processing systems 101, 102, 203-210 depicted in FIGS. 2A and 2B are now described further with reference to FIGS. 3, 4A, and 4B.

FIG. 3 depicts a flow diagram of a method 300 for establishing data connections between a plurality of processing systems according to one or more embodiments described herein. The method 300 can be implemented by any suitable processing system (e.g., the processing systems 101, 102 of FIG. 1 or FIG. 2; any of the processing systems 203-207, 215-217 of FIGS. 2A, 2B; the processing system 1200 of FIG. 12; etc.), any suitable processing device (e.g., the processing device 1221 of FIG. 12), and/or the like including combinations thereof.

At block 302, each of the plurality of processing systems (e.g., the processing systems 101, 102, 203-207) is assigned to one of a plurality of groups (e.g., the group 211, group B 212, group C 213). One such example having three groups is depicted in FIG. 2A, in which the processing systems 101, 203 are assigned to group A 211, the processing systems 204-206 are assigned to group B 212, and the processing systems 102 and 207 are assigned to group C 213. As another example having four groups as depicted in FIG. 2B, the processing systems 101, 203 are assigned to group A 211, the processing systems 204-206 are assigned to group B 212, the processing systems 102 and 207 are assigned to group C 213, and the processing systems 208-210 are assigned to group D 214. Each of the plurality of groups cycles, based on an offset time period, between states, which include an advertiser state (e.g., the advertiser state 111, 121 of FIG. 1), a listener state (e.g., the listener state 112, 122 of FIG. 1), and a sleep state (e.g., the sleep state 113, 123 of FIG. 1). While in the listener state, a processing system listens for advertisements sent by a processing system in the advertiser state. While in the sleep state, the processing system does not advertise or listen. In some examples, in the sleep state, the processing system partially or wholly shuts/powers down or disables a communication interface (e.g., the network adapter 1226 of FIG. 12).

Each of the processing systems assigned to a group cycles through the advertiser, listener, and sleep states based on an offset time period. That is, during a first cycle of the offset time period, each processing system assigned to a group is in one of the advertiser, listener, or sleep states; during a second cycle of the offset time period, each processing system assigned to the group is in another one of the advertiser, listener, or sleep states.

At block 304, a first processing system of a first group of the plurality of groups connects to a second processing system of a second group of the plurality of groups when the first group is in one of the listener state or the advertiser state and the second group is in the other of the listener state or the advertiser state. The following example of such connection is described with reference to the environment 200A of FIG. 2A. In this example, during a first cycle of the offset time period (that is, during a first period of time equal to the offset time period), the processing systems 101, 203 of the group A 211 are in an advertiser state, the processing systems 204, 205, 206 of the group B 212 are in the advertiser state, and the processing systems 102, 207 of the group C 213 are in the listener state (see FIG. 4A). During this first cycle, the processing systems 101, 203 of the group A 211 and the processing systems 204-206 of the group B 212 can attempt to connect to the processing systems 102, 207 of the group C 213. Once a connection is established between two processing systems (one being from the group A 211 and the other being from the group B 212), the connected processing systems can communicate by transmitting/receiving data.

Once the first cycle of the offset time period has concluded, a second cycle of the offset time period begins, and the processing systems 101, 102, 203-210 of the groups A 211, B 212, C 213 change states. In an example, each of the processing systems 101, 102, 203-207 of the groups A 211, B 212, C 213 enter the sleep state during the second cycle of the offset time period (see FIG. 4A). As another example, the processing systems 101, 102 of the group A 211 change from the advertiser state to the listener state; the processing systems 204-206 of the group B 212 change from the listener state to the sleep state; and the processing systems 102, 207 of the group C 213 change from the sleep state to the advertiser state.

In some examples, the processing systems of multiple groups can be in the same state. For example, as shown in the timing diagrams 400A, 400B of FIGS. 4A and 4B respectively, some groups can have processing systems in the advertiser state while another group (or groups) are in the listener state during a first cycle of the offset time period. Then, during a second cycle of the offset time period, the groups of processing systems are all in the sleep state. For example, in FIG. 4A and relating to the environment 200A of FIG. 2A, during a first cycle of the offset time period, the processing systems of groups A and B (e.g., the groups A 211, B 212) are in the advertiser state (shown as a value of "1") and the processing systems of group C (e.g., the group C 213) is in the listener state (shown as a value of "−1"). Then, during a second cycle of the offset time period, all of the processing systems of groups A, B, C are in the sleep state (shown as a value of "0"). During a third cycle of the offset time period, processing systems in the group A 211 are in the advertiser state while processing systems in the groups B and C are in the listener state.

As another example, as shown in FIG. 4A and relating to the environment 200B of FIG. 2B, during a first cycle of the offset time period, the processing systems of groups A, B, and D (e.g., the groups A 211, B 212, D 214) are in the advertiser state (shown as a value of "1") and the processing systems of group C (e.g., the group C 213) is in the listener state (shown as a value of "−1"). Then, during a second cycle of the offset time period, all of the processing systems of groups A, B, C, D are in the sleep state (shown as a value of "0"). During a third cycle of the offset time period, processing systems in the groups A and D are in the advertiser state while processing systems in the groups B and C are in the listener state.

With continued reference to FIG. 3, the offset time period of block 302 can be calculated based on an estimated amount of time that it takes to create a connection, referred to as $T_c$ or "connection time." That is, the offset time period is set to be longer than the connection time. In some examples, the processing systems assigned to an even-numbered group (e.g., the groups B 212, D 214) are in the advertiser state during a first offset time period cycle, and the processing systems assigned to odd-numbered groups (e.g., the groups A 211, C 213) are in the listener state during the first offset time period. In some examples, every other cycle, the processing systems transition into the sleep state; however, in some examples, the processing systems can be in the sleep state for multiple consecutive cycles (e.g., two or more cycles in a row). The processing systems then switch from listener state to advertiser state (or advertiser state to listener state) every second cycle, as shown in the timing diagrams 400A, 400B.

In some examples, a random number is assigned to each of the processing systems 101, 102, 203-210 to determine to which group they are assigned. By giving two (or more) processing systems the same random seed value, they can be kept in the same groups and not create connections to one another. Processing systems can be synchronized using a base time so that they are advertising (or listening) together. Any new processing system that is introduced or powered on would be able to synchronize with its group based on the randomly assigned value and based on the timing from the base time. After a predetermined period of time or a predetermined number of cycles, the processing systems can be assigned to new groups so that new connections can be formed. For example, every 30 cycles, the processing systems can be reassigned. In some examples, the reassignment is based at least in part on how many groups and how many processing systems are in an environment.

With continued reference to FIG. 3, additional processes also may be included. For example, the method 300 can further include, subsequent to connecting the first processing system to the second processing system, transmitting data from the first processing system to the second processing system. In such examples, the data is transmitted from the first processing system to the second processing system via Bluetooth Low Energy. It should be understood that the process depicted in FIG. 3 represents an illustration, and that other processes may be added or existing processes may be removed, modified, or rearranged without departing from the scope of the present disclosure.

Once two processing systems (e.g., the processing systems 101, 102) have connected, the processing systems can exchange information (i.e., transmit/receive data) as shown in FIG. 1 and as described herein. As described herein, it can be useful to exchange information between processing systems in emergency or natural disaster type situations. The present techniques provide for exchanging such information between two (or more) processing systems using a generic transport protocol that operates on top of BTLE.

A conventional approach to communicating in emergency or natural disaster type situations utilizes mesh networking. For example, a Mesh network can be based on a common wireless protocol available to many processing systems within a given population. Mesh networks rely on many individual nodes that route messages through each other in an ad-hoc manner until the message reaches its intended recipient. One such example of a commonly available wireless protocol is Bluetooth. Given that processing systems with Bluetooth wireless technology are pervasive in today's society, it makes sense to deploy such a network using Bluetooth. However, as described herein, such approaches, including Bluetooth, typically require user interaction to connect and exchange information. Bluetooth Low Energy, unlike traditional Bluetooth, allows for connections between processing systems to be made without manually pairing those processing systems, such as using the techniques described herein.

By design, the BTLE architecture is only intended to transfer very small packets (i.e., about 20 bytes) of structured data. The size limit and forced data structure of the BTLE architecture are not well suited for use as a general purpose data stream where the type of data and the size can vary. Although conventional Bluetooth would allow for data streams of arbitrary format and size, a manual pairing process or manual exchange of physical/virtual BTLE MAC addresses is required. This approach is unsuitable as it requires significant user involvement for every connection made and is not able to be automated.

The present techniques provide a generic transport protocol that operates on top of BTLE. This new protocol uses Base 64 encoding, for example, and segmenting to transport a general purpose data stream across a standard BTLE characteristic.

According to one or more embodiments described herein, a standard BTLE characteristic is defined as follows:

| Name | Size (bytes) | Data type | Characteristic Type |
|---|---|---|---|
| PayloadSize | 4 | Integer | Read |
| Payload | 20 | String | Read |

Figure 5A:
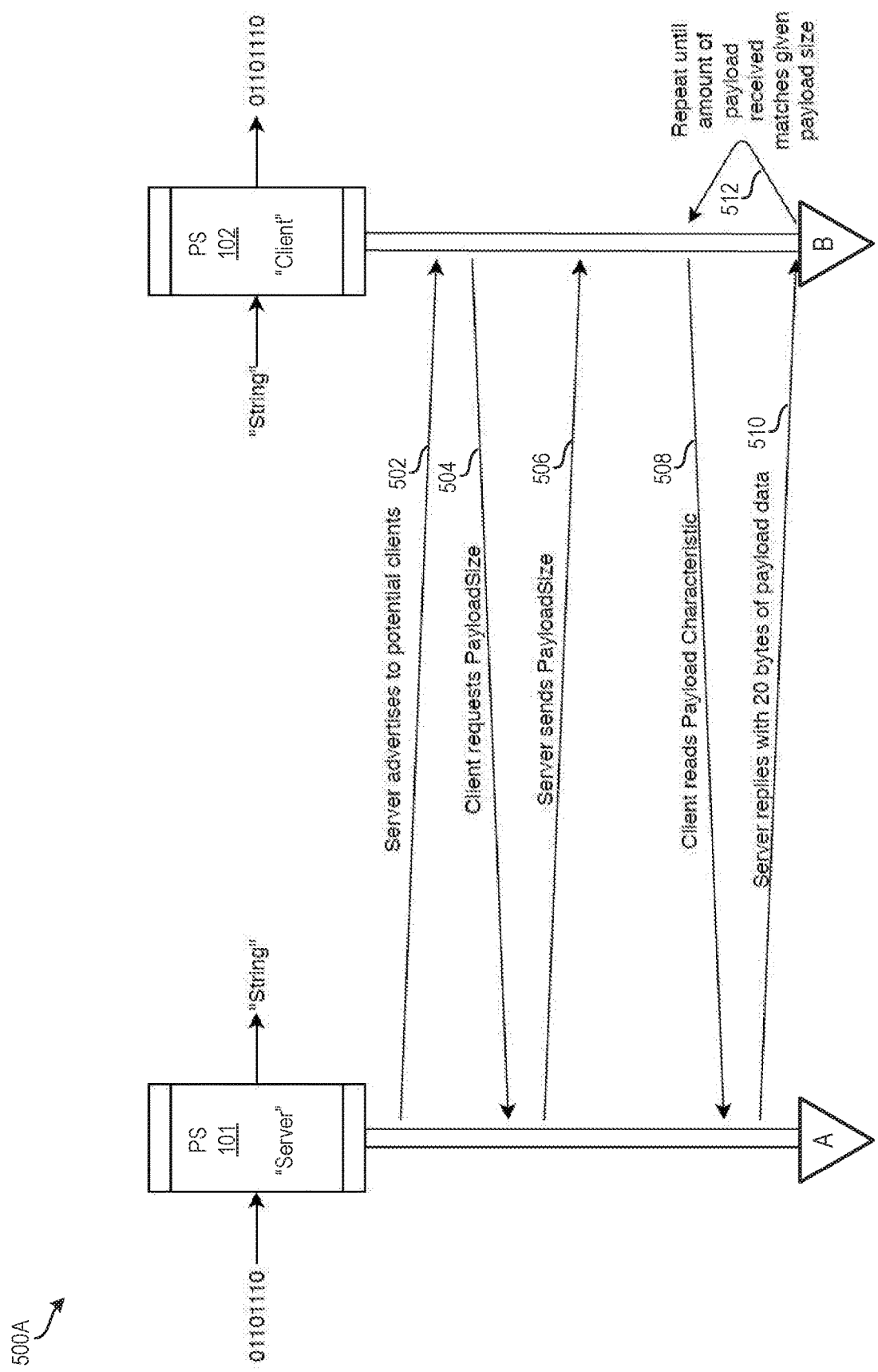
FIG. 5A depicts a sequence diagram of unidirectional communication between a first processing system and a second processing system according to one or more embodiments described herein.

FIG. 5A depicts a sequence diagram 500A of unidirectional communication between a first processing system (e.g., the processing system 101) and a second processing system (e.g., the processing system 102) according to one or more embodiments described herein. In this example, the processing system 101 is operating in the advertiser state, and the processing system 102 is operating in the listener state.

The processing system 101, operating as BTLE server (referred to simply as "server") in the advertiser state, first converts a binary data stream (e.g., "01101110") into a string using encoding such as Base 64 or another suitable encoding technique. Then the server advertises the standard BTLE characteristics described herein (arrow 502). The processing system 102, operating as a BTLE client (referred to simply as "client") in the listener state, connects, without any manual pairing process, to the server and requests the payload size ("PayloadSize") and payload characteristics from the server. For example, the client first requests the payload size from the server (arrow 504). The server responds with the size of the Base 64 encoded string that represents the data to be sent across the BTLE connection (arrow 506). In this example, BTLE is implemented, and data can be transmitted in a portion (or "chunks") that are a particular packetSize. As one such example, a packetSize can be chunks of 20-bytes, although it should be appreciated that the data can be transmitted in portions/chunks of other sizes in other examples. Once the client knows the payload size, then it can request the payload characteristic a total n/20 times (once more if there is a remainder on the division) (arrow 508). Each time the payload characteristic is read, the next 20 bytes in the stream are sent (arrows 510, 512). The server keeps track of how much data it has already sent so it knows which 20-byte chunk to send next. The client knows when the transfer has been completed by comparing the number of bytes received to the number of bytes the server provided via the PayloadSize characteristic. Once all of the data is received by the client, then the client can reconstruct the original data by running a Base 64 decode on the String received.

Figure 5B:
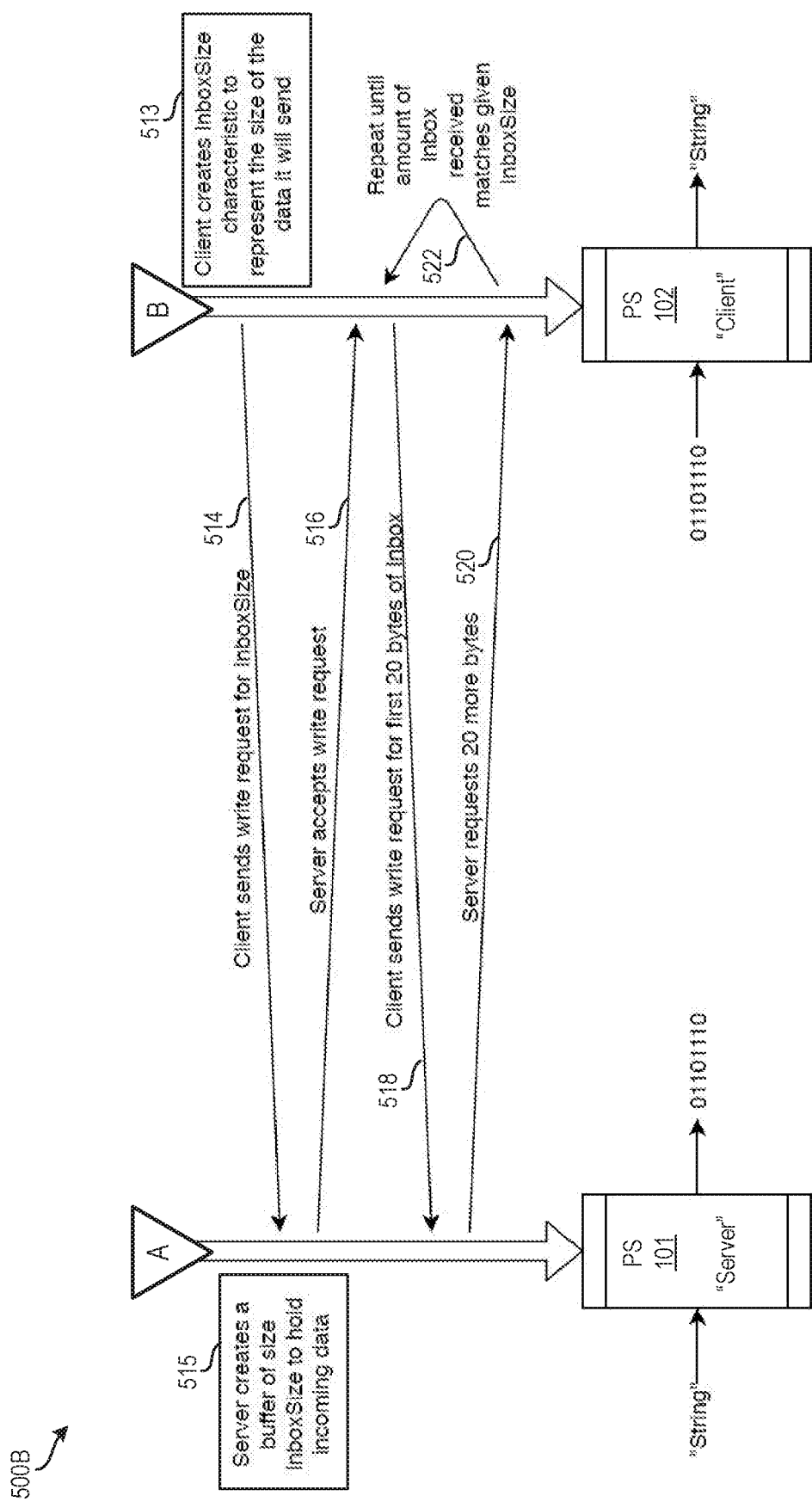
FIG. 5B depicts a sequence diagram of bidirectional communication between a first processing system and a second processing system according to one or more embodiments described herein.

Bidirectional Communication is also possible. For example, FIG. 5B depicts a sequence diagram 500B of bidirectional communication between the first processing system (e.g., the processing system 101 referred to as "server" in FIG. 5B) and the second processing system (e.g., the processing system 102 referred to as "client" in FIG. 5B) according to one or more embodiments described herein. To enable bidirectional communication between the server and the client, the server defines characteristics as follows:

| Name | Size (bytes) | Data type | Characteristic Type |
|---|---|---|---|
| InboxSize | 4 | Integer | Write |
| Inbox | 20 | String | Write |

The client can now construct a Base 64 encoded data stream to send to the server. The process is initiated by the client writing to the InboxSize characteristic. That is, the client creates the InboxSize characteristic to represent the size of the data it will send (block 513). The client writes the size in bytes of the data it is about to send to the inbox characteristic of the server and sends the write request for the inbox size (arrow 514). The server creates a buffer of the size InboxSize characteristic to hold the incoming data (block 515) and sends back acceptance of the write request (arrow 516).

The client then proceeds to write to the Inbox characteristic as many times as needed to send the entire data stream (arrow 518). Upon receiving a Write Request for InboxSize the server will create a buffer to hold InboxSize bytes of data (block 515). Upon receiving a Write Request for Inbox the server will append the received data to the aforementioned buffer and continue requesting more data (arrow 520). The server knows when the transfer has been completed by comparing the number of bytes received to the number of bytes the client provided when writing the InboxSize characteristic. Until the transfer is complete (i.e., until the amount of inbox received matches the InboxSize), the client 102 continues to send 20 bytes of data at a time (block 522). Once all the data is received by the server, then the server can reconstruct the original data by running a Base 64 decode on the String received.

The techniques depicted in FIGS. 5A and 5B can be used to pass arrays of messages (known as "postcards" in a mesh network). In examples, the client and server can bundle whatever messages they want to propagate into an array or list object. Those objects can then be Base 64 encoded and transferred via BTLE according to the techniques described herein. This effectively creates a completely automated mesh network operating on the pervasive and battery efficient BTLE protocol.

Figure 6:
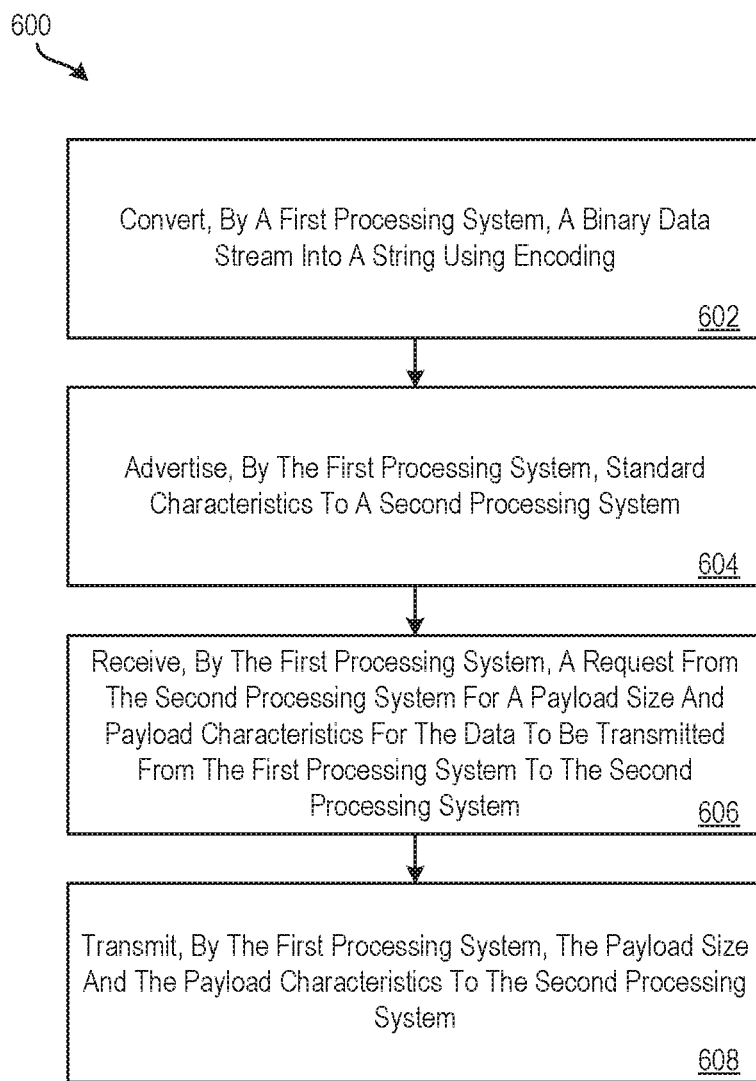
FIG. 6 depicts a flow diagram of a method for exchanging information between processing systems using a generic transport protocol according to one or more embodiments described herein.

FIG. 6 depicts a flow diagram of a method 600 for exchanging information between processing systems using a generic transport protocol according to one or more embodiments described herein. The method 600 can be implemented by any suitable processing system (e.g., the processing systems 101, 102 of FIG. 1 or FIG. 2; any of the processing systems 203-207, 215-217 of FIGS. 2A, 2B; the processing system 1200 of FIG. 12; etc.), any suitable processing device (e.g., the processing device 1221 of FIG. 12), and/or the like including combinations thereof.

At block 602, the processing system 101 converts a binary data stream into a string using encoding. The encoding can be any suitable encoding, for example, Base 64 encoding.

At block 604, the processing system 101 advertises standard characteristics to the processing system 102. According to one or more embodiments described herein, a standard BTLE characteristic is defined as follows:

| Name | Size (bytes) | Data type | Characteristic Type |
|---|---|---|---|
| PayloadSize | 4 | Integer | Read |
| Payload | 20 | String | Read |

According to one or more examples, subsequent to advertising the standard characteristics to the second processing system, a connection (e.g., the connection 130) is formed between the processing system 101 and the processing system 102 without a manual pairing process. In examples, the processing systems 101, 102 utilize BTLE to form the connection.

At block 606, the processing system 101 receives a request from the processing system 102 for a payload size and payload characteristics for the data to be transmitted from the first processing system to the second processing system. In some cases, the request for the payload size and the payload characteristics are separate requests (see, e.g., FIG. 5A). In examples, the payload size can be a size of the string encoded in Base 64 that represents the data to be sent across a connection (e.g., the connection 130) between the processing system 101 and the processing system 102.

At block 608, the processing system 101 transmits the payload size and the payload characteristics to the processing system 102. the transmitting is performed n/20 times, where n is a size of the data.

According to one or more embodiments described herein, additional processes also may be included. For example, the method 600 can include transmitting, by the processing system 100, the data to the processing system 102 via the connection (e.g., the connection 130). In some examples, the transmitting is performed n/20 times, where n is a size of the data. However, in other examples, the transmitting is performed (n/20)+1 times when n/20 yields a remainder. In additional examples, the method 600 further includes reconstructing, by the processing system 102, the data received from the processing system 101 by performing a Base 64 decoding on the data to generate the binary data stream. In additional examples, the processing system 102 can perform a second transmitting to transmit second data from the processing system 102 to the processing system 101. It should be understood that the process depicted in FIG. 6 represents an illustration, and that other processes may be added or existing processes may be removed, modified, or rearranged without departing from the scope of the present disclosure.

Continuing with the example application of the present techniques during emergency or natural disaster type situations, during such times people may lose the ability to communicate through typical techniques (e.g., making phone calls, sending a text message, etc.) as discussed. This makes it difficult to contact someone to find out if someone is safe. A conventional technique for people to connect and send information is through a mesh network. Mesh networks help send data across devices without needing a lot of infrastructure. Information is passed by processing systems making a connection to one another. The processing systems can connect according to the techniques described herein. Once connected, the processing systems can send small amounts of information/data to each other also as described herein.

One conventional technique for sending such information is using Bluetooth. Users can search and find one another to connect and share data. But the distance between users cannot be very large otherwise they cannot connect, or if a point of contact in the mesh goes away, then the rest of the connections can be separated from one another. Additionally, as described herein, Bluetooth requires user interaction to connect, so using a protocol such as BTLE may be preferable in emergency or natural disaster type situations or other similar situations desiring to eliminate the need for user interaction to connect processing systems. In such scenarios, processing systems may have limited connectivity and no way for connecting with cellular networks, etc., others besides sending data to other processing systems nearby in the mesh network. But no one outside that network will be able to receive the information. To extend mesh networks, additional hardware to extend connections would be needed to increase the signals sent by the processing systems and/or by forwarding the signals sent to increase the range and distance. This still limits the mesh networks by the accuracy and durability of the hardware used to extend signals.

The present techniques enable processing systems, such as phones and/or Internet of Things (IoT) devices, that are part of a mesh network to connect to each other and share data with a cloud computing environment (e.g., the cloud computing environment 50). The mesh network data that the devices send, using BTLE for example, between each other is in the form of a data postcard as described herein, which can contain information such as a public key and encrypted data. As an example, a postcard can include unencrypted data, such as a public key, and encrypted data, such as global positioning system (GPS) data, a timestamp, a message, etc.

A processing system can receive multiple postcards, bundle them together, and transmit them in whole or in part to another processing system and/or the cloud computing environment. In some examples, GPS coordinates of the sending in processing system and a timestamp associated with when the postcard was received are also included. A cloud database can be created as part of the mesh network to collect the postcards and can associate/relate the postcards based on GPS coordinates of the postcards. This allows processing systems in nearby mesh networks to obtain the information from other mesh networks when they connect to the cloud. Other mesh network solutions do not take advantage of using the cloud, GPS based coordinates, and timestamps to expand the network. This builds out the mesh network to include other processing systems that may not be close enough to connect physically. This enables the mesh network to obtain new information that certain processing systems have not previously obtained because they may not have had an interaction with those other processing systems.

As processing systems pass each other, they swap data postcards and build an internal database of these postcards. The present techniques provide for swapping data postcards over Bluetooth, for example, using BTLE. This swapping is done in the background without the user having any interaction. The data postcards that are sent back and forth among devices may contain a public key, some public information, and encrypted information. These data postcards are stored locally on the processing devices for example and are bundled together to create a postcard bundle.

The postcard bundle that has been created can be sent to other processing systems and/or into a cloud computing environment periodically or when a processing system establishes an internet connection. The data postcards sent from the mesh network are bundled with a timestamp and GPS coordinates. A GPS coordinate of one postcard associated with a particular processing system is based on the location of that processing system when it sent the postcard. It can be determined whether other processing devices in bundles are near that GPS location. If so, then those bundles are returned to the processing system. The sending processing system then receives back a bundle of data postcards to add to its internal database for the mesh network. This gives the sender additional data to pass back to other processing systems in the mesh network that would not have been possible.

Once postcards have been sent into the cloud computing environment, they begin to be aged out from the processing system(s) for example. This prevents duplicates of old postcards being passed around. Older postcards from the same public key postcard are aged out so that newer data is sent in subsequent bundles. Timestamps are also used to aid in the aging process. Older bundles from the cloud computing environment are not returned to sending processing systems if they are over an age threshold, for example, which can be adjustable. Old postcards (older than the threshold) are maintained in the cloud computing environment for potential searching and future use, for example.

According to some examples, a processing system can query to the cloud computing environment to find data postcards that match a public key input. The cloud database can be queried to provide specific data postcards by searching on a public key. All data postcards of that user identified from the public key are returned. Only those users that possess the data postcard creator's private key are able to decrypt the data postcards and see the information. This allows processing systems to search for individual users and to get information without being in the same mesh network.

FIGS. 7A-7F depict block diagrams of mesh-based communication for transmitting postcards between processing systems according to one or more embodiments described herein. These figures are described with reference to the elements depicted in FIGS. 1, 2A, and/or 2B but are not so limited.

Figure 7A:
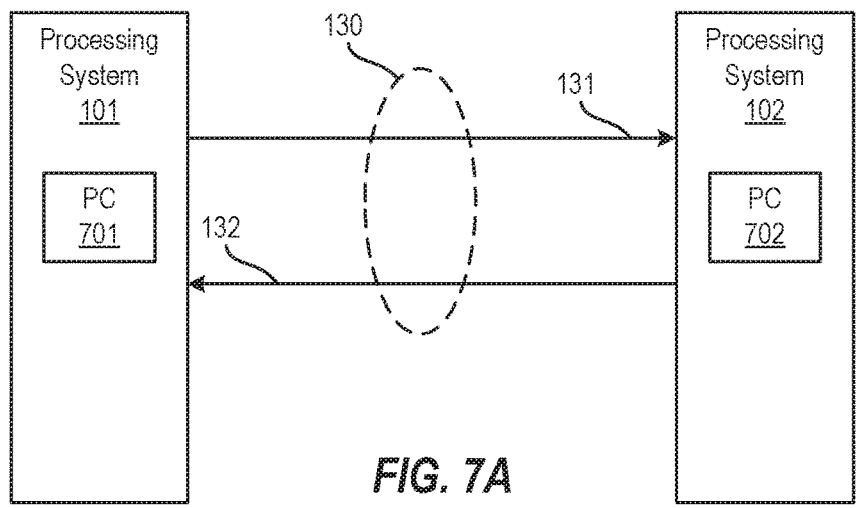
FIGS. 7A-7F depict block diagrams of mesh-based communication for transmitting postcards between processing systems according to one or more embodiments described herein.

As shown in FIG. 7A, the processing systems 101, 102 each have a postcard (PC) 701, 702 associated therewith. The postcard 701 includes information about the processing system 101 and the postcard 702 includes information about the processing system 102. A connection 130 is formed between the processing systems 101, 102.

Figure 7B:
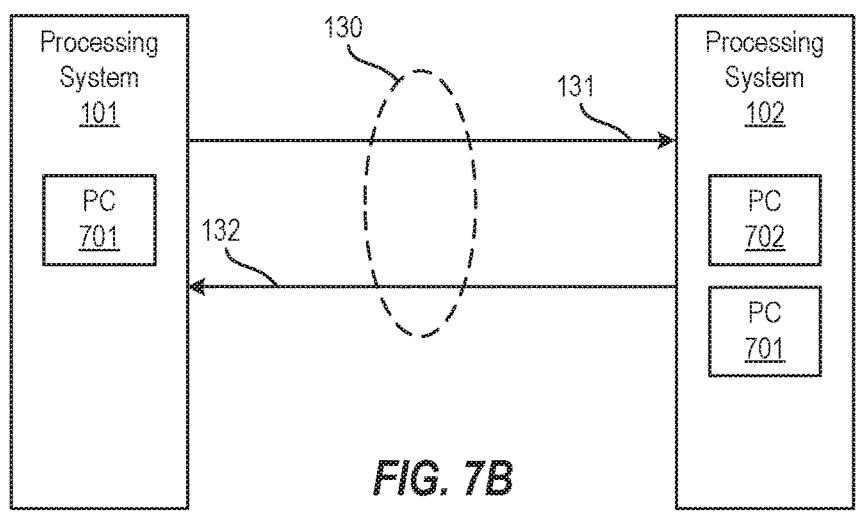

As shown in FIG. 7B, the processing system 101 transmits its postcard 701 to the processing system 102 via the connection 130 (see arrow 131). In this way, the processing system 102 stores both its own postcard 702 and the postcard 701 of the processing system 101.

Figure 7C:
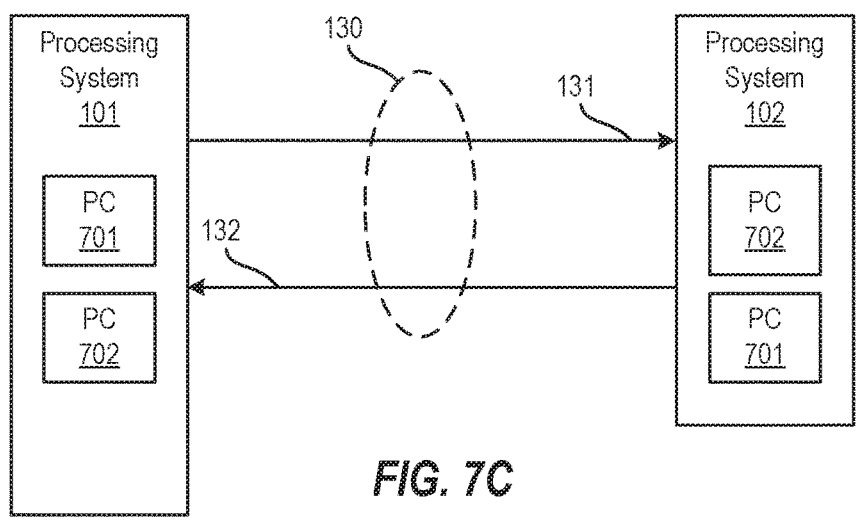

As shown in FIG. 7C, the processing system 102 transmits its postcard 702 to the processing system 101 via the connection 130 (see arrow 132). In this way, the processing system 101 stores both its own postcard 701 and the postcard 702 of the processing system 102.

Figure 7D:
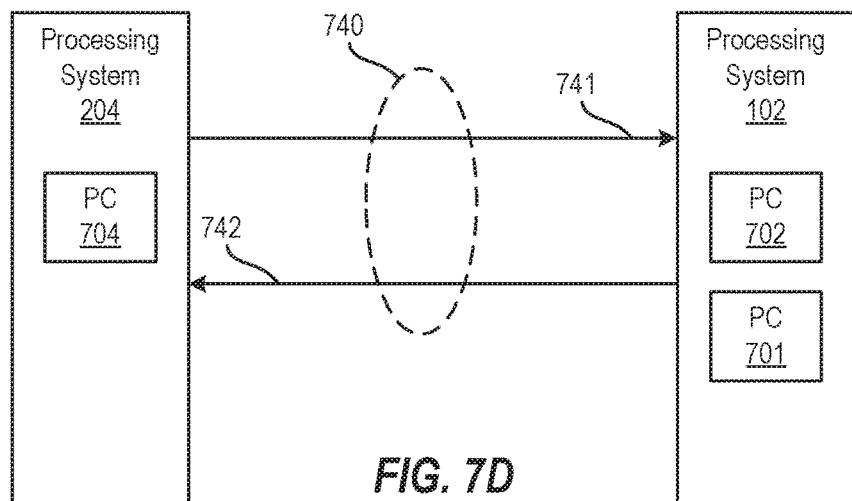

As shown in FIG. 7D, a connection 740 is formed between the processing system 102 and another processing system, namely the processing system 204. This can occur, for example, after the connection 130 between the processing systems 101, 102 is terminated. The processing system 102 still has copies of its own postcard 702 as well as the postcard 701 of the processing system 101 while the processing system 204 has a copy of its own postcard 704.

Figure 7E:
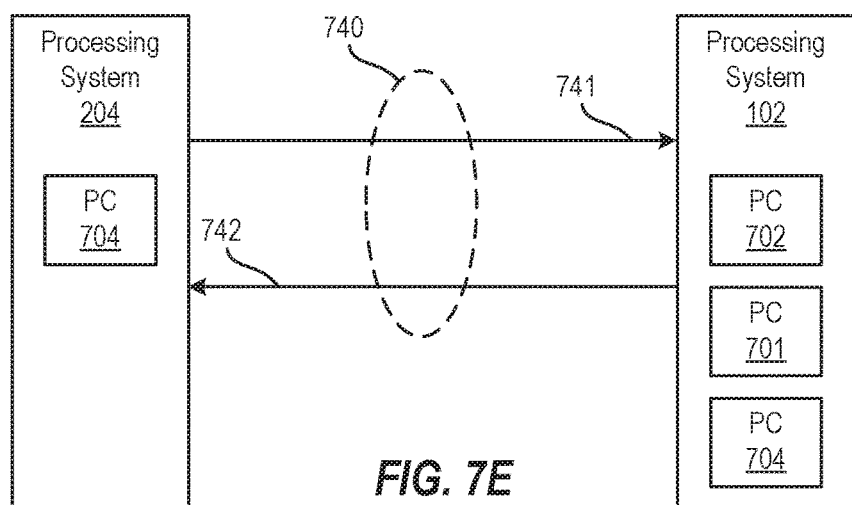

As shown in FIG. 7E, the processing system 204 transmits its postcard 704 to the processing system 102 via the connection 740 (see arrow 741). In this way, the processing system 102 stores its own postcard 702, the postcard 701 of the processing system 101, and the postcard 704 of the processing system 204.

Figure 7F:
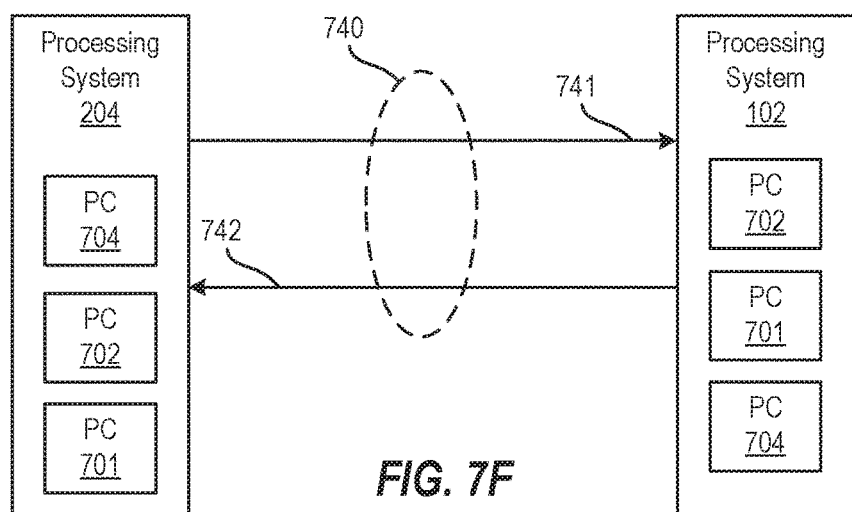

As shown in FIG. 7F, the processing system 102 transmits its postcard 702 and the postcard 701 of the processing system 101 to the processing system 204 via the connection 704 (see arrow 742). In this way, the processing system 204 stores its own postcard 704, the postcard 701 of the processing system 101, and the postcard 702 of the processing system 102.

Figure 8:
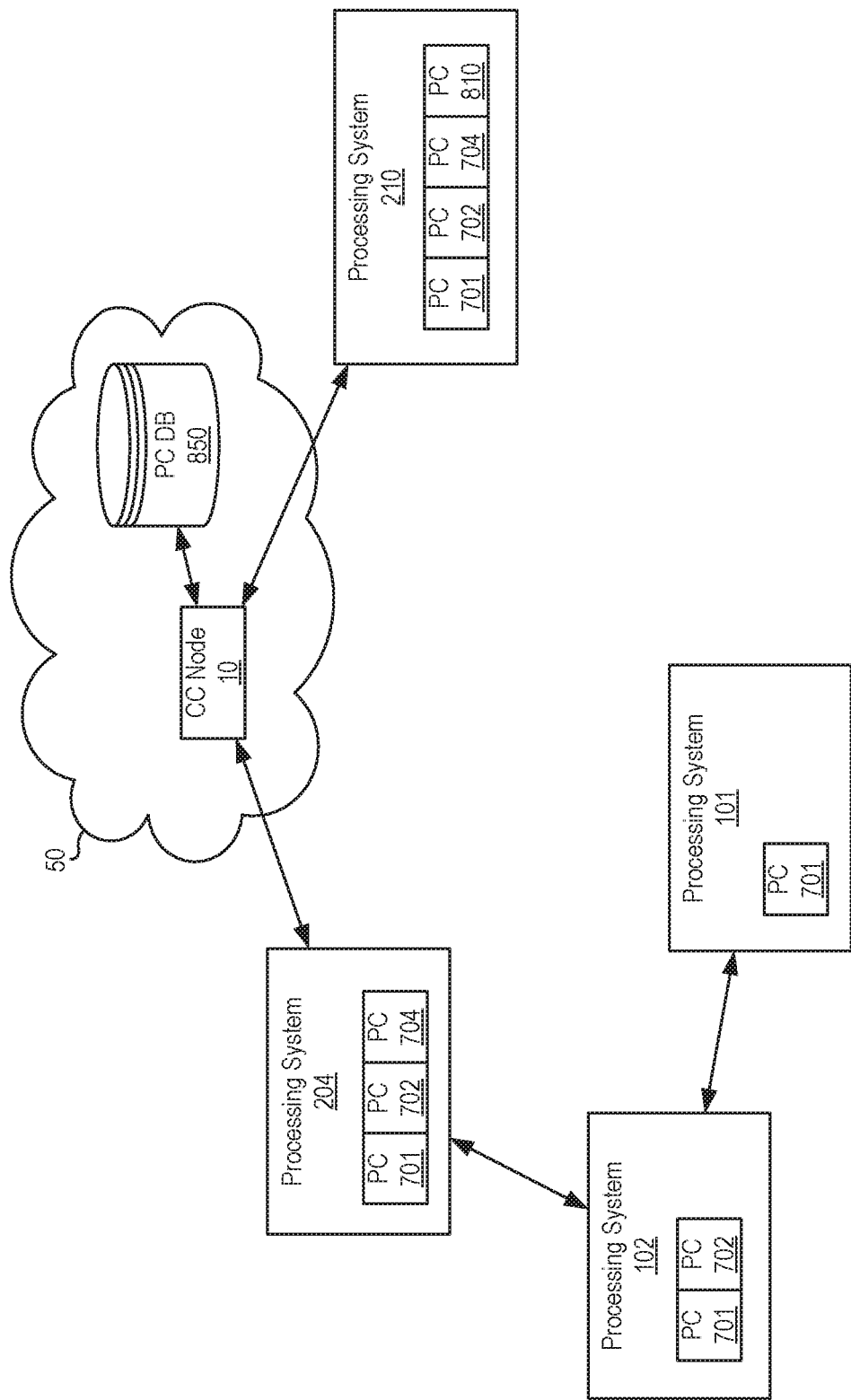
FIG. 8 depicts a block diagram of mesh-based communication for transmitting postcards between processing systems and a cloud computing environment according to one or more embodiments described herein.

One or more of the processing systems 101, 102, 204 shown in FIGS. 7A-7F can then transmit any postcards for which they have copies to a cloud computing node of a cloud computing environment. For example, FIG. 8 depicts a block diagram of mesh-based communication for transmitting postcards between processing systems and a cloud computing environment, such as cloud computing environment 50 of FIG. 10, according to one or more embodiments described herein.

In this example, as in FIGS. 7A-7F, the processing systems 101, 102, 204 each have an associated postcard 701, 702, 704 respectively. The postcards 701, 702, 704 can be transmitted to a cloud computing node 10 of the cloud computing environment 50 and stored in a postcard database ("PC DB") 850 within the cloud computing environment 50 or elsewhere as appropriate. The postcards 701, 702, 704 can also be transmitted to another processing system (e.g., the processing system 210), which may not be directly in connection with (or is not even in the same physical proximity to) the processing systems 101, 102, 204. In this way, information about the processing systems 101, 102, 204 can be shared with the processing system 210 via the cloud computing environment 50 by sharing the postcards 701, 702, 704.

It should be appreciated that the processing system 210 can include its own postcard 810, which can be shared with the processing systems 101, 102, 204 via the cloud computing environment in much the same way that it received the postcards 701, 702, 704.

Figure 9:
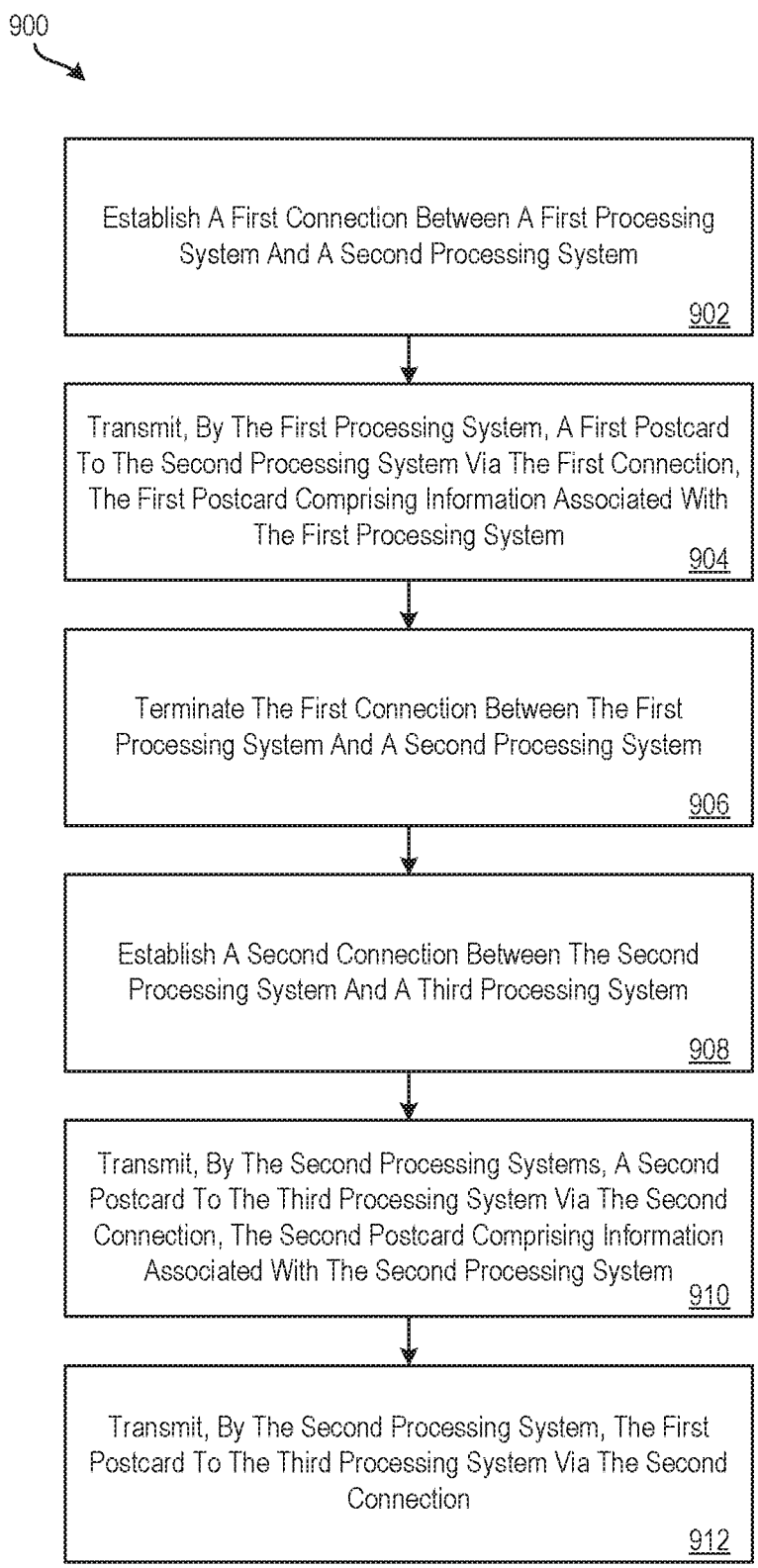
FIG. 9 depicts a flow diagram of a method for mesh-based communication for transmitting postcards between processing systems according to one or more embodiments described herein.

FIG. 9 depicts a flow diagram of a method 900 for mesh-based communication for transmitting postcards between processing systems according to one or more embodiments described herein. The method 900 can be implemented by any suitable processing system (e.g., the processing systems 101, 102 of FIG. 1 or FIG. 2; any of the processing systems 203-207, 215-217 of FIGS. 2A, 2B; the processing system 1200 of FIG. 12; etc.), any suitable processing device (e.g., the processing device 1221 of FIG. 12), and/or the like including combinations thereof.

At block 902, a first connection (e.g., the connection 130) between a first processing system (e.g., the processing system 101) and a second processing system (e.g., the processing system 102) is established. At block 904, the first processing system transmits a first postcard (e.g., the postcard 701) to the second processing system via the first connection. The first postcard includes information associated with the first processing system. For example, the first postcard can include unencrypted data and encrypted data. The unencrypted data can include a public key. The encrypted data can include global positioning system data associated with a location of the first processing system at a time that the first postcard was transmitted to the second processing system, a timestamp defining the time that the first postcard was transmitted to the second processing system, and a message. At block 906, the first connection between the first processing system and a second processing system is terminated.

At block 908, a second connection (e.g., the connection 740) between the second processing system and a third processing system (e.g., the processing system 204) is established. At block 910, the second processing system transmits a second postcard (e.g., the postcard 702) to the third processing system via the second connection. The second postcard includes information associated with the second processing system. For example, the second postcard can include unencrypted data and encrypted data. The unencrypted data can include a public key. The encrypted data can include global positioning system data associated with a location of the first processing system at a time that the second postcard was transmitted to the third processing system, a timestamp defining the time that the second postcard was transmitted to the third processing system, and a message. At block 912, the second processing system transmits the first postcard to the third processing system via the second connection. In this way, the third processing system receives the postcards of both the first and second processing systems (e.g., both postcards 701, 702).

According to one or more embodiments described herein, additional processes also may be included. For example, the method 900 can include establishing a third connection between the third processing system and a cloud computing node of a cloud computing environment. The method 900 can further include transmitting, by the third processing systems, a third postcard to the cloud computing node via the third connection. The third postcard includes information associated with the third processing system. The method 900 further includes transmitting, by the second processing system, the first postcard to the cloud computing node via the third connection and/or transmitting, by the second processing system, the first postcard to the cloud computing node via the third connection. In some examples, the method 900 further includes receiving, by the third processing system, one or more additional postcards from the cloud computing node of the cloud computing environment via the third connection. the one or more additional postcards are selected from a plurality of postcards (e.g., the postcards stored in the postcard DB 850), the selection being based at least in part on global positioning system data and a timestamp associated with each of the plurality of postcards. It should be understood that the process depicted in FIG. 9 represents an illustration, and that other processes may be added or existing processes may be removed, modified, or rearranged without departing from the scope of the present disclosure.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
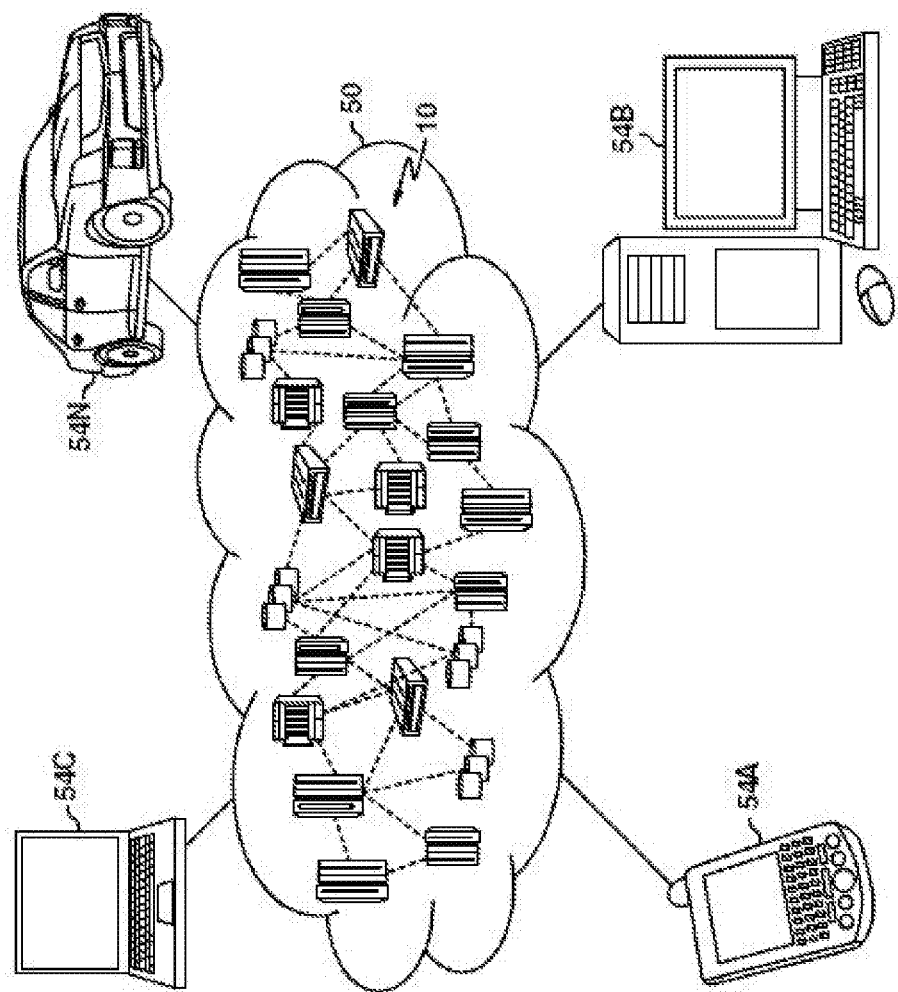
FIG. 10 depicts a cloud computing environment according to one or more embodiments described herein.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
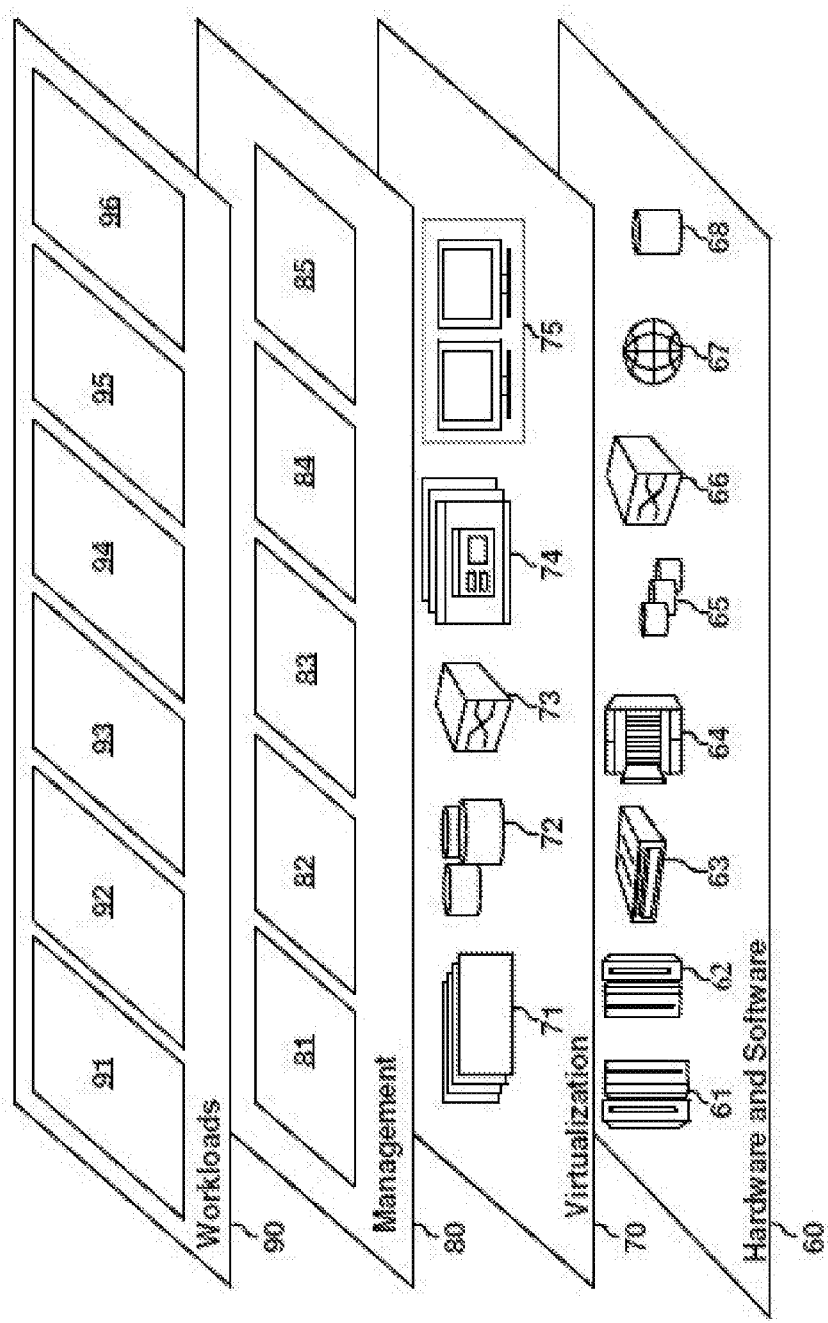
FIG. 11 depicts abstraction model layers according to one or more embodiments described herein.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transmitting and receiving postcards 96.

Figure 12:
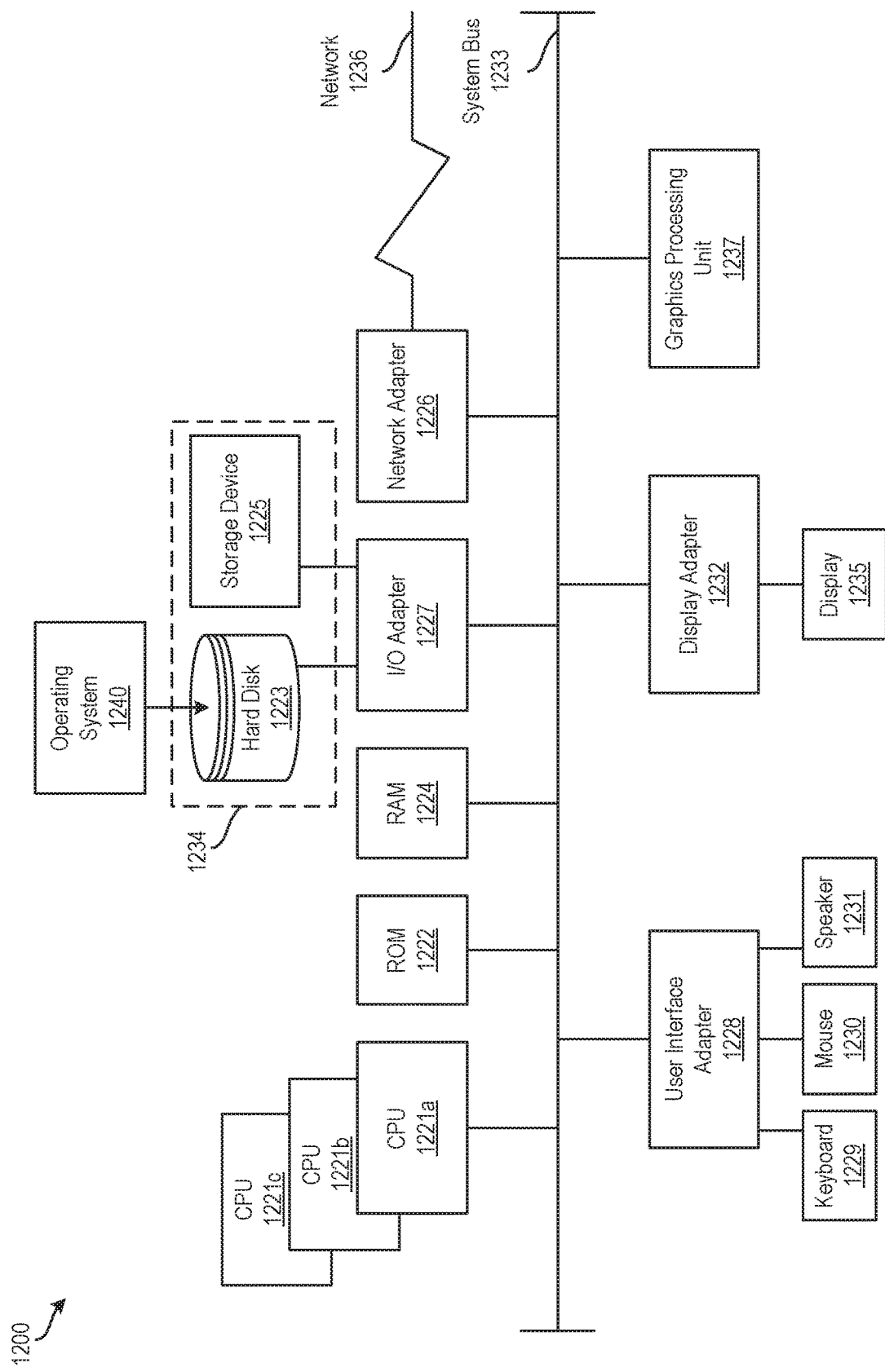
FIG. 12 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 12 depicts a block diagram of a processing system 1200 for implementing the techniques described herein. In accordance with one or more embodiments described herein, the processing system 1200 is an example of a cloud computing node 10 of FIG. 10. In examples, processing system 1200 has one or more central processing units ("processors" or "processing resources") 1221*a*, 1221*b*, 1221*c*, etc. (collectively or generically referred to as processor(s) 1221 and/or as processing device (s)). In aspects of the present disclosure, each processor 1221 can include a reduced instruction set computer (RISC) microprocessor. Processors 1221 are coupled to system memory (e.g., random access memory (RAM) 1224) and various other components via a system bus 1233. Read only memory (ROM) 1222 is coupled to system bus 1233 and may include a basic input/output system (BIOS), which controls certain basic functions of processing system 1200.

Further depicted are an input/output (I/O) adapter 1227 and a network adapter 1226 coupled to system bus 1233. I/O adapter 1227 may be a small computer system interface (SCSI) adapter that communicates with a hard disk 1223 and/or a storage device 1225 or any other similar component. I/O adapter 1227, hard disk 1223, and storage device 1225 are collectively referred to herein as mass storage 1234. Operating system 1240 for execution on processing system 1200 may be stored in mass storage 1234. The network adapter 1226 interconnects system bus 1233 with an outside network 1236 enabling processing system 1200 to communicate with other such systems.

A display (e.g., a display monitor) 1235 is connected to system bus 1233 by display adapter 1232, which may include a graphics adapter to improve the performance of graphics intensive applications and a video controller. In one aspect of the present disclosure, adapters 1226, 1227, and/or 1232 may be connected to one or more I/O busses that are connected to system bus 1233 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1233 via user interface adapter 1228 and display adapter 1232. A keyboard 1229, mouse 1230, and speaker 1231 may be interconnected to system bus 1233 via user interface adapter 1228, which may include, for example, a Super I/O chip integrating multiple device adapters into a single integrated circuit.

In some aspects of the present disclosure, processing system 1200 includes a graphics processing unit 1237. Graphics processing unit 1237 is a specialized electronic circuit designed to manipulate and alter memory to accelerate the creation of images in a frame buffer intended for output to a display. In general, graphics processing unit 1237 is very efficient at manipulating computer graphics and image processing, and has a highly parallel structure that makes it more effective than general-purpose CPUs for algorithms where processing of large blocks of data is done in parallel.

Thus, as configured herein, processing system 1200 includes processing capability in the form of processors 1221, storage capability including system memory (e.g., RAM 1224), and mass storage 1234, input means such as keyboard 1229 and mouse 1230, and output capability including speaker 1231 and display 1235. In some aspects of the present disclosure, a portion of system memory (e.g., RAM 1224) and mass storage 1234 collectively store the operating system 1240 such as the AIX® operating system from IBM Corporation to coordinate the functions of the various components shown in processing system 1200.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for establishing data connections between a plurality of processing systems, the method comprising:
    assigning each of the plurality of processing systems to one of a plurality of groups, wherein each group of the plurality of groups cycles, based on an offset time period, between an advertiser state, a listener state, and a sleep state;
    connecting a first processing system of a first group of the plurality of groups to a second processing system of a second group of the plurality of groups when the first group is in one of the listener state or the advertiser state and the second group is in the other of the listener state or the advertiser state;
    advertising, by the first processing system, standard characteristics to the second processing system;
    receiving, by the first processing system, a request from the second processing system for a payload size and payload characteristics for the data to be transmitted from the first processing system to the second processing system; and
    transmitting, by the first processing system, the payload size and the payload characteristics to the second processing system.

2. The computer-implemented method of claim 1, wherein the first group of the plurality of groups is in the advertiser state for the offset time period during a first cycle, and wherein the second group of the plurality of groups in in the listener state for the offset time period during the first cycle.

3. The computer-implemented method of claim 2, wherein the first group transitions from the advertiser state to the sleep state subsequent to expiration of the first cycle of the offset time period for the offset time period during a second cycle, and wherein the second group transitions from the listener state to the sleep state subsequent to expiration of the first cycle of the offset time period for the offset time period during the second cycle.

4. The computer-implemented method of claim 3, wherein the first group transitions from the sleep state to the listener state subsequent to expiration of the second cycle of the offset time period, and wherein the second group transitions from the sleep state to the advertiser state subsequent to expiration of the second cycle of the offset time period.

5. The computer-implemented method of claim 2, wherein the first group transitions from the advertiser state to the listener state subsequent to expiration of the first cycle of the offset time period for the offset time period during a second cycle, and wherein the second group transitions from the listener state to the advertiser state subsequent to expiration of the first cycle of the offset time period for the offset time period during the second cycle.

6. The computer-implemented method of claim 5, wherein the first group transitions from the listener state to the sleep state subsequent to expiration of the second cycle of the offset time period for the offset time period during a third cycle, and wherein the second group transitions from the advertiser state to the sleep state subsequent to expiration of the second cycle of the offset time period for the offset time period during the third cycle.

7. The computer-implemented method of claim 1, further comprising:
    subsequent to connecting the first processing system to the second processing system, causing transmitting data from the first processing system to the second processing system.

8. The computer-implemented method of claim 7, wherein the data is transmitted from the first processing system to the second processing system via Bluetooth Low Energy.

9. The computer-implemented method of claim 1, wherein the offset time period is longer than an estimated amount of time that it takes to connect the first processing system of the first group of the plurality of groups to the second processing system of the second group of the plurality of groups.

10. A system comprising:
a memory comprising computer readable instructions; and
one or more processing devices for executing the computer readable instructions, the computer readable instructions controlling the one or more processing devices to perform operations for establishing data connections between a plurality of processing systems, the operations comprising:
assigning each of the plurality of processing systems to one of a plurality of groups, wherein each group of the plurality of groups cycles, based on an offset time period, between an advertiser state, a listener state, and a sleep state;
connecting a first processing system of a first group of the plurality of groups to a second processing system of a second group of the plurality of groups when the first group is in one of the listener state or the advertiser state and the second group is in the other of the listener state or the advertiser state;
causing the first processing system to advertise standard characteristics to the second processing system;
causing the first processing system to receive a request from the second processing system for a payload size and payload characteristics for the data to be transmitted from the first processing system to the second processing system; and
causing the first processing system to transmit the payload size and the payload characteristics to the second processing system.

11. The system of claim 10, wherein the first group of the plurality of groups is in the advertiser state for the offset time period during a first cycle, and wherein the second group of the plurality of groups in in the listener state for the offset time period during a first cycle.

12. The system of claim 11, wherein the first group transitions from the advertiser state to the sleep state subsequent to expiration of the first cycle of the offset time period for the offset time period during a second cycle, and wherein the second group transitions from the listener state to the sleep state subsequent to expiration of the first cycle of the offset time period for the offset time period during the second cycle.

13. The system of claim 12, wherein the first group transitions from the sleep state to the listener state subsequent to expiration of the second cycle of the offset time period, and wherein the second group transitions from the sleep state to the advertiser state subsequent to expiration of the second cycle of the offset time period.

14. The system of claim 11, wherein the first group transitions from the advertiser state to the listener state subsequent to expiration of the first cycle of the offset time period for the offset time period during a second cycle, and wherein the second group transitions from the listener state to the advertiser state subsequent to expiration of the first cycle of the offset time period for the offset time period during the second cycle.

15. The system of claim 14, wherein the first group transitions from the listener state to the sleep state subsequent to expiration of the second cycle of the offset time period for the offset time period during a third cycle, and wherein the second group transitions from the advertiser state to the sleep state subsequent to expiration of the second cycle of the offset time period for the offset time period during the third cycle.

16. The system of claim 10, wherein the operations further comprise:
subsequent to connecting the first processing system to the second processing system, causing transmitting data from the first processing system to the second processing system.

17. The system of claim 16, wherein the data is transmitted from the first processing system to the second processing system via Bluetooth Low Energy.

18. The system of claim 10, wherein the offset time period is longer than an estimated amount of time that it takes to connect the first processing system of the first group of the plurality of groups to the second processing system of the second group of the plurality of groups.

19. A computer program product comprising a computer readable storage medium having program instructions embodied therewith, the program instructions executable by one or more processors to cause the one or more processors to perform operations for establishing data connections between a plurality of processing systems, the operations comprising:
assigning each of the plurality of processing systems to one of a plurality of groups, wherein each group of the plurality of groups cycles, based on an offset time period, between an advertiser state, a listener state, and a sleep state;
connecting a first processing system of a first group of the plurality of groups to a second processing system of a second group of the plurality of groups when the first group is in one of the listener state or the advertiser state and the second group is in the other of the listener state or the advertiser state;
causing the first processing system to advertise standard characteristics to the second processing system;
causing the first processing system to receive a request from the second processing system for a payload size and payload characteristics for the data to be transmitted from the first processing system to the second processing system; and
causing the first processing system to transmit the payload size and the payload characteristics to the second processing system.

* * * * *